United States Patent [19]
Garten et al.

[11] 4,201,426
[45] May 6, 1980

[54] BEARING CLAMPING ASSEMBLY FOR A GAS TURBINE ENGINE

[75] Inventors: Herbert Garten, Marblehead; Donald A. Brozenske, Wenham, both of Mass.

[73] Assignee: General Electric Company, Lynn, Mass.

[21] Appl. No.: 900,542

[22] Filed: Apr. 27, 1978

[51] Int. Cl.² .............................................. F16C 25/08
[52] U.S. Cl. ..................... 308/26; 308/184 R; 308/207 A; 308/236; 415/170 R; 417/407
[58] Field of Search ....... 308/26, DIG. 15, 36.1–36.5, 308/236, 189 A, 207 A, 216, 187.1, 184 R, 207 R, 189 R; 415/170 R, 168, 196, 190; 417/407

[56] References Cited

U.S. PATENT DOCUMENTS

| 3,571,886 | 3/1971 | Corsmeier | 308/207 R X |
| 3,823,553 | 7/1974 | Smith | 415/190 X |
| 3,909,085 | 9/1975 | Wilkinson et al. | 308/189 R |
| 4,027,931 | 6/1977 | Streifert | 308/26 X |
| 4,046,430 | 9/1977 | Buono et al. | 308/26 |
| 4,053,189 | 10/1977 | Novotny | 308/26 |

FOREIGN PATENT DOCUMENTS 808410 2/1959 United Kingdom ................ 308/189 R Primary Examiner—Douglas C. Butler
Attorney, Agent, or Firm—Derek P. Lawrence; Henry J. Policinski

[57] ABSTRACT

A bearing clamping assembly for a gas turbine engine for preventing relative rotation between a first shaft and a shaft bearing assembly race in the event of bearing failure. The clamping assembly is comprised of an axially resilient member disposed near the bearing assembly which applies an axial force to the bearing race to maintain it in position relative to the shaft. The first shaft is secured to a second shaft by an axial clamp. The clamping of the two shafts compresses the resilient member which responds by applying the axial force on the bearing race to maintain the race in position in the event of bearing failure.

5 Claims, 3 Drawing Figures

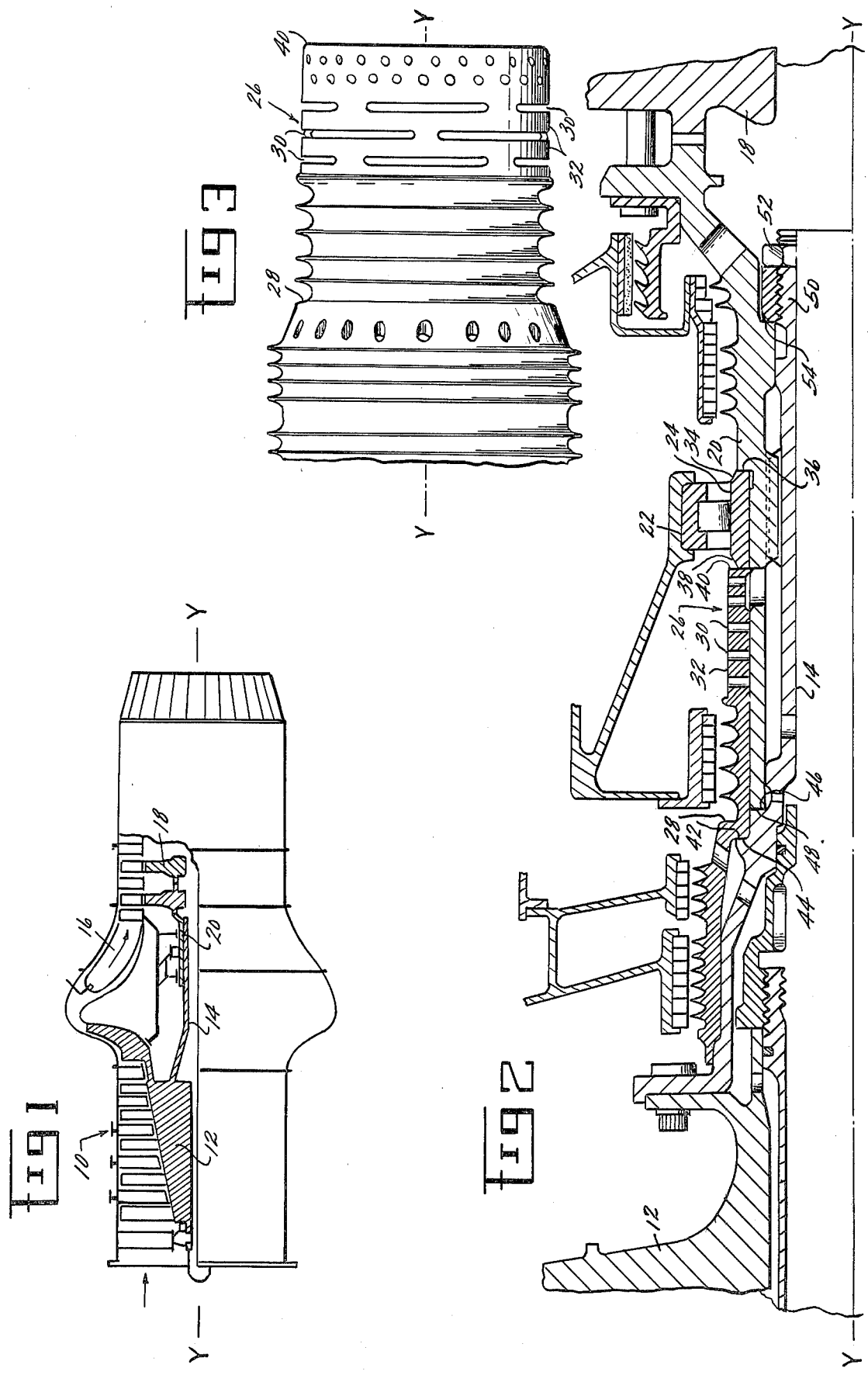

BEARING CLAMPING ASSEMBLY FOR A GAS TURBINE ENGINE

BACKGROUND OF THE INVENTION

1. Field of the Invention

This invention relates to a bearing clamping assembly and, more particularly, to an assembly for clamping a shaft bearing race to a shaft on a gas turbine engine.

2. Description of the Prior Art

In prior art apparatus having a rotating shaft supported by a roller bearing, one of the races of the bearing is designed to rotate with the shaft by virtue of an interference fit between the shaft and the race. In the event of bearing failure, the heat generated by the failed bearing causes the race to expand, thereby allowing it to rotate relative to the shaft. Such bearing race/shaft relative rotation could lead to an actual severing of the shaft, thereby resulting in failure or malfunction of the apparatus.

The prior art addressed this potential problem by rigidly clamping the bearing race to the shaft. By way of example, in a gas turbine engine having a rotating turbine shaft supported by a roller bearing, one end of the bearing race was abutted against a shoulder on the turbine shaft. The other end of the race was engaged by a rigid cylindrical member, the other end of which abutted a shoulder on the compressor shaft. A locknut on the compressor shaft was torqued to provide a primary joint clamping load between the turbine shaft and the compressor shaft. The path of the joint clamping load through the turbine shaft, bearing race rigid cylindrical member and compressor shaft, thereby rigidly clamped the bearing race to the turbine shaft to prevent race/shaft relative rotation in the event of bearing failure.

Although the above-described configuration effectively prevented race/shaft relative rotation during periods of bearing failure, the number of contact points involved in establishing the requisite joint clamping load through the above described path made proper compressor shaft-turbine shaft alignment difficult to accomplish. The instability which resulted from the alignment difficulties resulted in engine vibration problems. The problem of effectively preventing bearing race/shaft relative rotation without significantly affecting the joint clamping load between the compressor shaft and the turbine shaft is overcome by the present invention.

It is an object of the present invention to provide a bearing clamping assembly which effectively prevents relative rotation between a turbine shaft and the race of a turbine shaft bearing without affecting the joint clamping load between the turbine shaft and the compressor shaft.

A further object of the present invention is to provide such a bearing clamping assembly which is economical to produce and which does not increase the weight or assembly time of the engine.

A further object of the present invention is to provide such a bearing clamping assembly which utilizes existing component parts.

SUMMARY OF THE INVENTION

Briefly stated, this and other objects which will hereinafter become apparent are accomplished by the present invention, which, in one form, provides an assembly for clamping a bearing race to a first shaft in order to effectively prevent relative rotation between the bearing race and the shaft in the event of bearing failure. The clamping assembly is comprised of a resilient member which is located around a portion of the first shaft which is surrounded by a second shaft and is positioned between one end of the bearing race and a shoulder on the second shaft. The other end of the bearing race abuts a shoulder on the first shaft. Clamping means on the second shaft forces the first shaft into engagement with the second shaft and provides a joint clamping load between the two shafts. As a result of the joint clamping load the resilient member is axially compressed, thereby providing an axial force upon the bearing race which is sufficient to prevent the bearing race from rotating relative to the turbine shaft in the event of bearing failure.

BRIEF DESCRIPTION OF THE DRAWINGS

FIG. 1 is a schematic representation of a gas turbine engine depicting the preferred embodiment of the present invention.

FIG. 2 is an enlarged view of a portion of FIG. 1.

FIG. 3 is a greatly enlarged plan view of the compressor discharge seal of the engine of FIG. 1.

DESCRIPTION OF THE PREFERRED EMBODIMENT

Referring to FIG. 1, there is depicted schematically a gas turbine engine shown generally at 10 which is comprised of a compressor 12, a combustor section 16 and a turbine 18. The turbine 18 includes a generally cylindrical turbine shaft 20, which partially surrounds and is drivingly connected to a generally circular compressor shaft 14 in order to power the compressor 12. Engine 10 is typical of state-of-the-art gas turbine engines and a detailed description of its operation is not necessary for purposes of describing the present. A detailed description of the operation of engine 10 is provided by U.S. Pat. No. 3,823,553, which is assigned to the General Electric Company, the assignee of the present invention.

The present invention is usable for clamping bearing races to the various shafts throughout the engine. By way of example, as best seen in FIG. 2, the turbine shaft 20 is journaled for rotation in a circular roller bearing assembly 22. The bearing assembly 22 includes an annular inner race 24 which is fixed to and rotates with the turbine shaft 20. The inner race 24 has an inner diameter which is slightly smaller than that of the turbine shaft 20. Fixing the inner race 24 to the turbine shaft 20 is accomplished by heating the inner race 24 until it expands to a diameter larger than that of the turbine shaft 20. The inner race 24 is then slipped onto the turbine shaft 20 and is allowed to cool, thereby shrinking around the turbine shaft 20 and forming a tight interference fit.

Under normal operating conditions, the above-described interference fit is sufficient to maintain the attachment between the inner race 24 and the turbine shaft 20. However, in the event of bearing failure, the heat generated by a failed bearing may cause the inner race 24 to heat up and expand, thereby disengaging the inner race 24 from the turbine shaft 20 and allowing it to rotate relative to the turbine shaft 20. Such race relative rotation could potentially lead to severing of the turbine shaft 20 and a resulting engine failure.

The present invention includes an axially resilient member 26 which, in this embodiment, is comprised of a tubular flexing member which acts to place an axial force upon the inner race 24 in order to prevent the race 24 from rotating relative to the turbine shaft 20. Axially as used herein means a direction along the axis Y—Y shown in the drawings. In this embodiment, the flexing member 26 is formed in the aft portion of the compressor discharge seal 28. Aft as used herein means toward the right along axis Y—Y shown in the drawings. As best seen in FIG. 3, the flexing member 26 is comprised of three rows of elongated spaced arcuate slots 30 which have been cut into the aft portion of the compressor discharge seal 28 to form two rows of beams 32 which flex under an axial load. By incorporating the flexing member 26 as a part of the existing compressor discharge seal, the objects of the present invention are achieved without increasing the overall weight or assembly time of the engine. In addition because of the simplicity of forming the flexing member as part of the existing seal, the cost of implementing the invention is minimal.

A first end 34 of the inner race 24 engages an annular shoulder 36 on the outside of the cylindrical turbine shaft 20. The second end 38 of the inner race 24 engages an end 40 of the compressor discharge seal 28 which contains the tubular flexing member 26. A shoulder portion 42 of the compressor discharge seal 28 engages an annular shoulder 44 on the compressor shaft 14. The portion of the compressor discharge seal 28 between the shoulder portion 42 and the end 40 is slightly longer than the distance between the second end 38 of the inner race 24 and the annular shoulder 44 on the compressor shaft 14 so that when assembled the flexing member 26 is compressed to place an axial force on the inner race 24.

An end 46 of turbine shaft 20 engages an annular shoulder 48 on the compressor shaft 14. Threaded on an end 50 of the compressor shaft 14 is a clamping means 52 which, in this embodiment, is comprised of a locknut which engages an annular shoulder 54 on the inside of the cylindrical turbine shaft 20.

Assembly is accomplished by tightening the locknut 52, thereby forcing the turbine shaft 20 to move to the left and the compressor shaft 14 to move to the right. As a result, the end 46 of the turbine shaft 20 is forced against the shoulder 48 on the compressor shaft 14. Additional tightening of the locknut creates a joint clamping load between the turbine shaft 20 and the compressor shaft 14 to maintain continuous contact between the two shafts. The further tightening of the locknut also results in the shoulder 36 on the turbine shaft 20, forcing the bearing inner race 24 to the left against the end 40 of the flexing member 26. The shoulder 44 on the compressor shaft 14 correspondingly forces the shoulder portion 42 of the compressor discharge seal 28 to the right. The result is that the tubular flexing member 26 is axially compressed, thereby putting an axial force upon the inner race 24, forcing it against the shoulder 36 on the turbine shaft 20. The axial force is sufficient to maintain the inner race 24 in a fixed relationship with the turbine shaft 20 despite the expansion of the inner race 24 due to the possible failure of the bearing 22.

The present invention represents a significant improvement over the prior art since the path of the joint clamping load between the turbine shaft 20 and the compressor shaft 14 goes through only one axial contact point, shoulder 48 and turbine shaft end 46. The prior art joint clamping load path was through several axial contact points, thereby resulting in alignment difficulties and engine vibration problems. The single joint clamping load contact point of the present invention alleviates the prior art alignment difficulties while still effectively preventing relative rotation between the turbine shaft 20 and the bearing inner race 24.

From the foregoing description it can be seen that the present invention comprises an assembly for clamping an inner bearing race to a turbine shaft to effectively prevent relative rotation between the inner race and the shaft in the event of bearing failure. It will be obvious to one skilled in the art that changes may be made to the above-described invention without departing from the broad inventive concepts thereof. It is to be understood, therefore, that this invention is not limited to the particular embodiment disclosed, but it is intended to cover all modifications which are within the spirit and scope of this invention as claimed.

What is claimed is:

1. A bearing clamping assembly for a gas turbine engine comprising:
   (a) a first shaft member;
   (b) a second shaft member surrounding a portion of said first shaft member;
   (c) a bearing assembly supporting one of said shaft members for rotation, said assembly including a race member affixed to said one of said shaft members;
   (d) an axially resilient member disposed proximate said bearing assembly and adapted to apply an axial force to said race member; and
   (e) clamping means for securing said first shaft member to said second shaft member, said clamping means further adapted to compress said resilient member, said resilient member applying said axial force in response to said compression.

2. A bearing clamping assembly for a gas turbine engine comprising:
   (a) a generally circular compressor shaft including a first shoulder and a second shoulder disposed thereon;
   (b) a generally cylindrical turbine shaft surrounding a portion of said compressor shaft and having one end engaging said first shoulder, said turbine shaft including a third shoulder and a fourth shoulder disposed thereon;
   (c) a bearing assembly surrounding a portion of said turbine shaft for supporting said turbine shaft for rotation, said bearing assembly including an inner race fixed for rotation with said turbine shaft, said inner race having a first end and second end, said first end engaging said third shoulder;
   (d) an axially resilient member surrounding said turbine shaft, said member being disposed between and engaging said second shoulder and said second end of said inner race; and
   (e) a locknut disposed on one end of said compressor shaft and engaging said fourth shoulder, said locknut being torqued to create a compressive load to maintain said turbine shaft in engagement with said first shoulder and to maintain said resilient member in engagement with said second shoulder and said second end of said inner race.

3. The bearing clamping assembly of claim 2 wherein said resilient member is comprised of a tubular flexing member having a plurality of spaced arcuate circumferential openings.

4. The bearing clamping assembly of claim 3 wherein said openings comprise three rows of elongated spaced arcuate slots, said slots acting to form two rows of beams which flex under an axial load.

5. The bearing clamping assembly of claim 4 and further including a cylindrical compressor discharge sealing member wherein said sealing member includes said tubular flexing member in the aft portion thereof.

* * * * *